United States Patent [19]
LaBerge

[11] Patent Number: 6,134,656
[45] Date of Patent: Oct. 17, 2000

[54] METHOD FOR BLOCKING BUS TRANSACTIONS DURING RESET

[75] Inventor: Paul A. LaBerge, Shoreview, Minn.

[73] Assignee: Micron Technology, Inc., Boise, Id.

[21] Appl. No.: 09/056,197

[22] Filed: Apr. 7, 1998

[51] Int. Cl.[7] ............................. G06F 15/177; G06F 1/12; G06F 13/00
[52] U.S. Cl. .................................. 713/1; 713/400; 710/108
[58] Field of Search ..................... 713/1, 2, 100, 713/400, 401, 500; 710/100, 108, 129, 107, 110

[56] References Cited

U.S. PATENT DOCUMENTS

| | | | |
|---|---|---|---|
| 5,377,325 | 12/1994 | Chan | 395/200 |
| 5,524,237 | 6/1996 | Bestler | 395/550 |
| 5,758,170 | 5/1998 | Woodward et al. | 395/740 |
| 5,832,241 | 11/1998 | Guy | 395/292 |

*Primary Examiner*—William Grant
*Assistant Examiner*—Ronald D. Hartman, Jr.
*Attorney, Agent, or Firm*—Dorsey & Whitney LLP

[57] ABSTRACT

The present invention comprises a method for blocking transactions on a host bus until a target agent is out of reset, comprising synchronizing a reset signal received by the host bus such that the reset signal is clocked in the clock domain of the target agent, determining whether the reset signal clocked in the target agent clock domain is deasserted and blocking transactions on the host bus until it is determined that the reset signal clocked in the target agent clock domain has been deasserted.

11 Claims, 4 Drawing Sheets

METHOD FOR BLOCKING BUS TRANSACTIONS DURING RESET

This application contains similar subject matter to a copending application entitled "A Device for Blocking Bus Transactions During Reset," filed on even date herewith, Ser. No. 09/056,198.

1. FIELD OF THE INVENTION

The present invention relates generally to reset commands in electronic devices. More particularly, the present invention relates to blocking transactions within a computer system while computer system components are in reset.

2. BACKGROUND OF THE INVENTION

In a typical computer system, a reset command may be issued or asserted by a component or device within the computer system. The reset command may instruct all of the components and devices within the computer system to reset to a state of initial conditions or an initial configuration. A component or device of a computer system receiving a reset command or in the process of executing a reset command may be said to be in reset or in a reset condition. A component or device of a computer system that is no longer receiving a reset command or has executed a reset command may be said to be out of reset.

Because a computer system's processor(s) may be clocked at the highest clock frequency within the computer system, the processor(s) may execute a reset command and be out of reset before other computer system components or devices clocked at relatively lower clock frequencies have executed the reset command. In such cases, a processor or other requesting agent may attempt to issue a transaction on the primary or host bus to a component or device (the "addressed agent" or "target agent") that is still in reset. In some cases, because the target agent is still in reset, the processor may receive erroneous information from the target agent. In other cases, the processor may erroneously re-boot the entire computer system. Thus, in general, it is desirable that a processor or other requesting agent be prevented or blocked from issuing a transaction on the host bus to a target agent while the target agent is in reset.

There are a variety of schemes in the art for accomplishing this goal. In some situations, the minimum frequency at which target agents may be clocked is limited. In these situations, the minimum clock frequency of the target agents may be limited such that the target agents execute the reset command (and are therefore out of reset) before the processor can itself execute the reset command and issue a transaction to the target agent on the host bus.

There are several disadvantages to this scheme. First, the limit on the minimum clock frequency of the target agent may limit the types of target agents that may be integrated into the computer system. Second, when troubleshooting or debugging a computer system, it may be desirable to clock a target agent at a substantially lower than normal clock frequency, in order to determine whether timing is a cause of the trouble. Clocking a target agent at a substantially lower than normal clock frequency may also enhance signal resolution in display test equipment. Thus, limiting the minimum clock frequency of the target agent may eliminate some methods for debugging computer systems.

In other situations, delay timers for holding the processor(s) in reset have been used. In these situations, the delay timers may be programmed or configured to hold the processor(s) in reset for a certain time period such that the processor(s) are unable to initiate transactions on the host bus before the target agent is out of reset. This scheme also suffers from disadvantages. For example, during some operations, a target agent may be clocked at a normal, relatively high frequency, while during other operations (such as the debugging procedure referenced above), the target agent may be clocked at a relatively low frequency. In such cases, the delay timer, not being responsive to the clock frequency of the target agent, must be programmed or configured to account for the lowest frequency at which the target agent may be clocked (i.e., to account for the longest time period during which the target agent may be in reset). Thus, in situations where the target agent is seldom clocked at the relatively low frequency, the delay timer scheme will, more often than not, hold the processor in reset for a longer time period than is necessary for the target agent to be out of reset and accessible over the host bus. Thus, the delay timer may unnecessarily prolong, for example, the computer system's boot-up process.

In still other situations, both of the above schemes have be jointly implemented. While this may help to alleviate the magnitude of the disadvantages discussed above, the disadvantages themselves will remain.

Thus, there exists a need in the art for improved apparatus and methods for controlling the transactions on a host bus to prevent the host from accessing a target agent while the target agent is in reset.

3. SUMMARY OF THE INVENTION

The present invention comprises a method for blocking transactions on a host bus until a target agent is out of reset, comprising synchronizing a reset signal received by the host bus such that the reset signal is clocked in the clock domain of the target agent, determining whether the reset signal clocked in the target agent clock domain is deasserted and blocking transactions on the host bus until it is determined that the reset signal clocked in the target agent clock domain has been deasserted.

Figure 1:
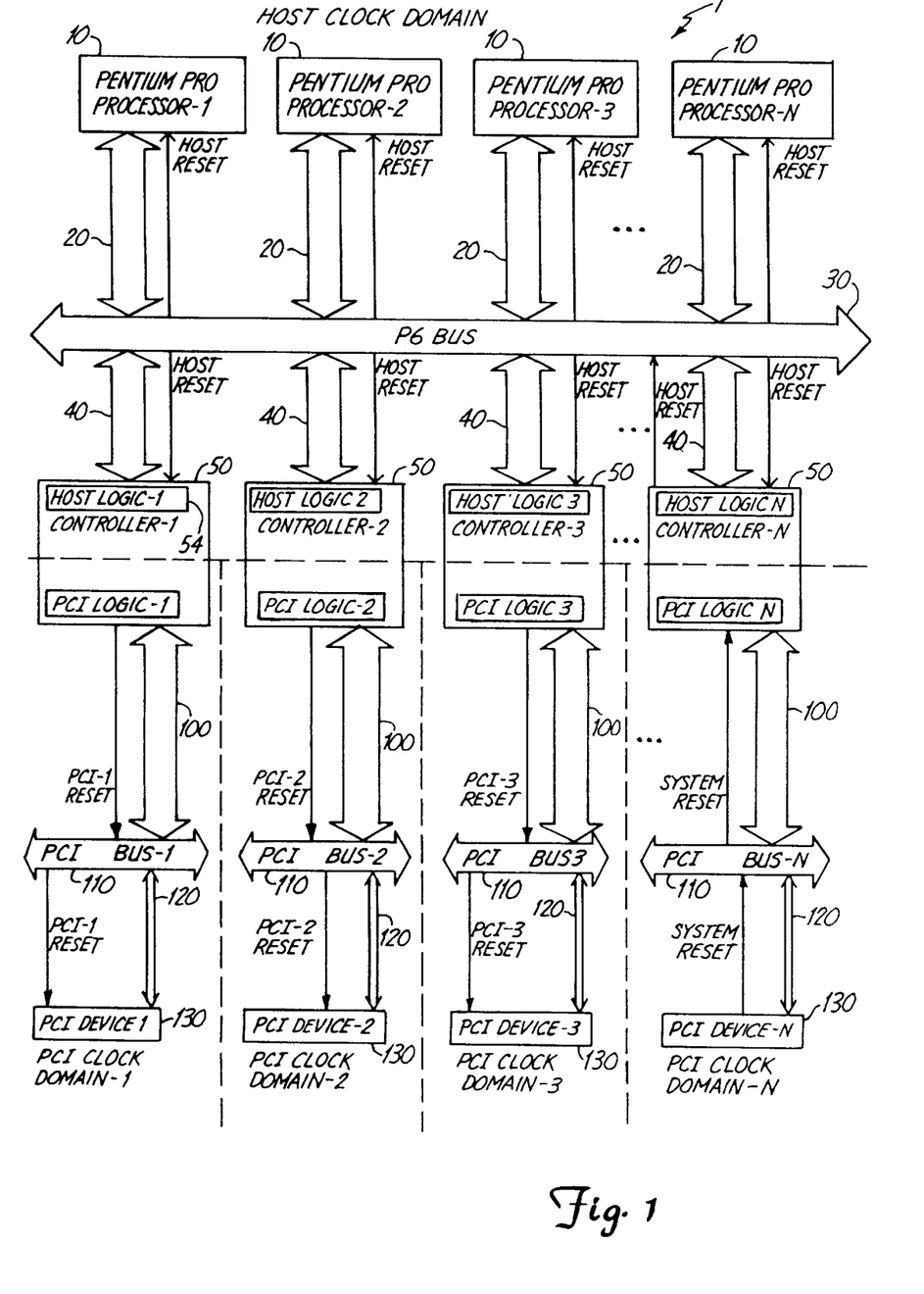
FIG. 1 is a block diagram of a computer system comprising one embodiment of the present invention.

5. DETAILED DESCRIPTION 5.1 Description of Operating Environment and Components In FIG. 1, there is shown a computer system 1 of one embodiment of the present invention. FIG. 1 illustrates a multi-processor computer system, although the present invention may be equally beneficial in single processor computer systems. In FIG. 1, there are shown a plurality of processors 10 operably connected to a primary or host bus 30 by connections 20. Also operably connected to the host bus 30 via connections 40 are a plurality of controllers 50. Operably connected to each of the controllers 50 is a respective secondary device 130. The secondary devices 130 are operably connected to their respective controllers 50 via respective secondary buses 110. Each secondary bus 110 is operably connected to its respective secondary device 130 via connections 120 and to its respective controller 50 via connections 100.

All the components of the computer system 1 operably connected to the host bus 30 may be referred to as bus agents. A bus agent, such as the processor 10, that issues a transaction to the host bus 30 may be referred to as a requesting agent. A bus agent, such as a secondary device 130, addressed by a transaction issued by a requesting agent may be referred to as a target agent.

Each processor 10 may be any conventional general purpose single- or multi-chip processor such as a Pentium® Pro processor, a Pentium® processor, a 8051 processor, a MIPS® processor, a Power PC® processor, or an ALPHA® processor. In addition, each processor 10 may be any conventional special purpose processor such as a digital signal processor or a graphics processor. The following detailed description describes one embodiment of the present invention with reference to, and in terms of, the Pentium Pro processor, but is not intended to be in any way so limited.

The host bus 30 may be a processor bus according to the processors 10 utilized in the system. The following detailed description describes the present invention with reference to, and in terms of, the Pentium Pro processor bus or P6 bus, but is not intended to be in any way so limited. Generally, the Pentium Pro processors 10 may issue transactions (such as read requests) to secondary devices 130 (such as the PCI devices 130 shown in FIG. 1) via the host bus 30, a respective controller 50 and a respective secondary bus 110 (such as the PCI buses 110 shown in FIG. 1). The following detailed description describes one embodiment of the present invention with reference to, and in terms of, PCI devices and PCI buses, but is not intended to be in any way so limited. Additionally, in such a case, reference numbers may be used interchangeably (i.e., the reference number "130" may refer to a secondary device 130 or a PCI device 130).

The controllers 50 may control transactions between the P6 bus 30 and a controller's respective PCI bus 110 (i.e., transactions between the Pentium Pro processors 10 and the PCI devices 130) and may be referred to as P6 to PCI bridge controllers. Each controller 50 may comprise host bus logic 54 for interfacing with the P6 bus 30 and PCI bus logic 52 for interfacing with a respective PCI bus 110.

As shown in FIG. 1, a clock domain may be defined with respect to each system component, including each bus, that is clocked at a different speed or frequency. Signals internal It to a particular system component (i.e., signals that transition or change levels on the rising or falling edge of the particular system component's clock) are said to be "within" or "clocked in" the clock domain of the particular system component.

In FIG. 1, the Pentium Pro processors 10, the P6 bus 30 and portions of the controllers 50, including the host bus logic 54, may be said to be clocked within the primary or host clock 16 domain. The host clock domain may, for example, have a clock frequency of 100 MHz. (In fact, each Pentium Pro processor 10 and its respective host bus logic 54 may be within its own respective clock domain).

Each of the PCI devices 130, the respective PCI buses 10 and some portions of the respective controllers 50, including the PCI bus logic 52, may be said to be clocked within a 21 respective PCI clock domain. For example, in FIG. 1, the first PCI device 130 (and its respective PCI bus 110 and PCI bus logic 52) may be clocked within a first PCI clock domain having a clock frequency of 16 MHz, the second PCI device 130 (and its respective PCI bus 110 and PCI bus logic 52) may be clocked within a second PCI clock domain having a clock frequency of 33 MHz, the third PCI device 130 (and its respective PCI bus 110 and PCI bus logic 52) may be clocked within a third PCI clock domain having a clock frequency of 50 MHz and the Nth PCI device 130 (and its respective PCI bus 110 and PCI bus logic 52) may be clocked within an Nth PCI clock domain having a clock frequency of 66 MHz.

A reset signal or command may be issued or asserted by any of the components or devices of the computer system 1, including the Pentium Pro processors 10, the PCI devices 130 and other system components not shown in FIG. 1. The reset command may be a "system" reset command instructing or commanding all of the components of the computer system 1 to reset. For example, in FIG. 1, the Nth PCI device 130 is shown asserting a reset command. The reset command may be provided to the host bus 30 via the Nth PCI bus 110 and the Nth controller 50 via connections 120, 100 and 40. (For clarity, the reset command may be shown separately from the connections on which the reset command is carried). The host bus 30 may provide the reset command to all of the components or devices operably connected to the host bus 30, including the Pentium Pro processors 10 and the plurality of PCI devices 130 through their respective controllers 50 and PCI buses 110.

In general, a reset command must be synchronously provided to components and devices clocked within the same clock domain. Thus, when a reset command is asserted by a system component clocked in a first clock domain and provided to system components clocked in a second clock domain, the reset command must be translated or synchronized into the second clock domain such that the reset command is aligned with the clock signal of the second clock domain (i.e., such that the reset command may be asserted and deasserted on the rising or falling edge of a clock transition within the second clock domain).

Figure 2:
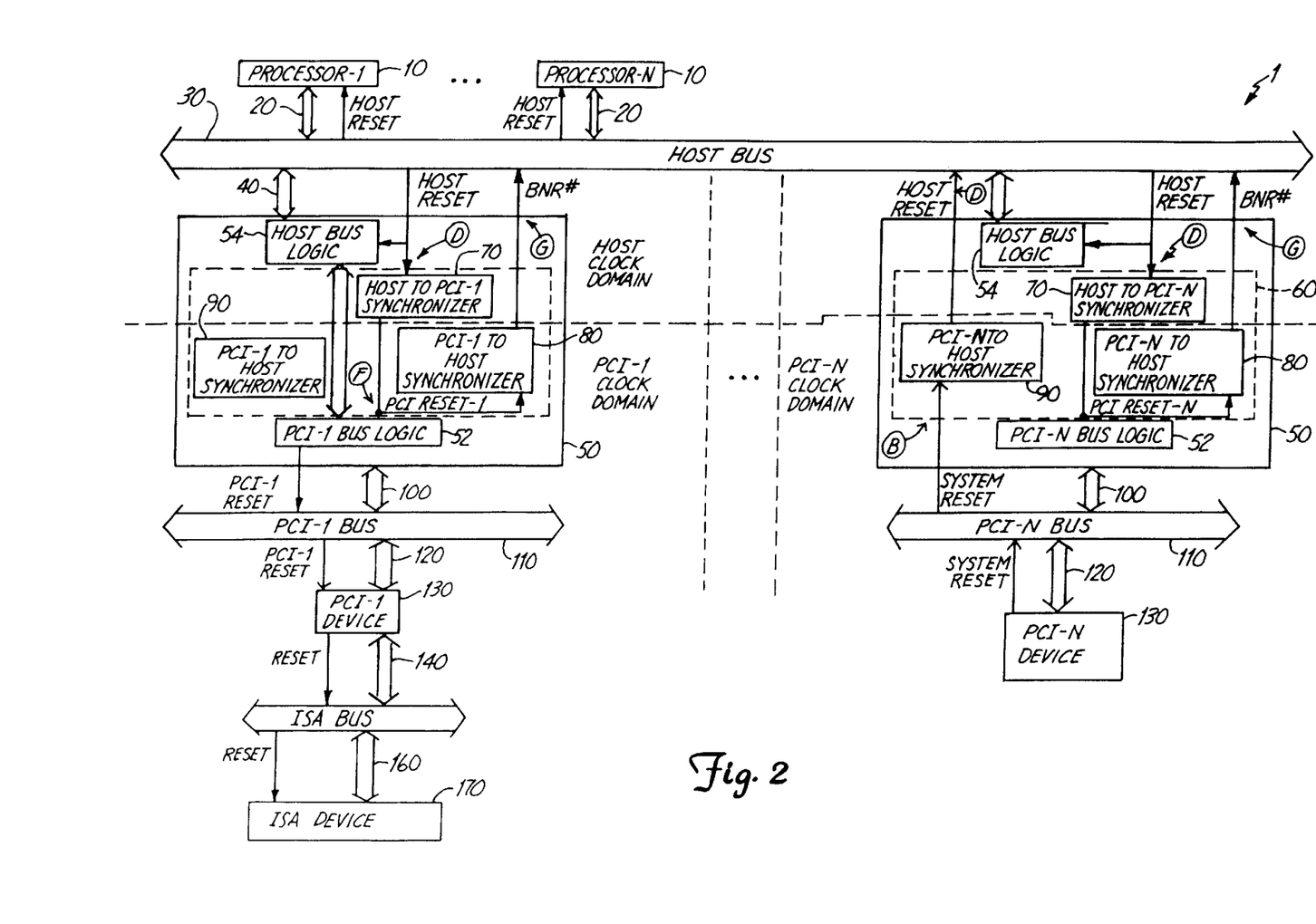
FIG. 2 is a block diagram illustrating some of the components shown in FIG. 1 in greater detail.
Figure 3:
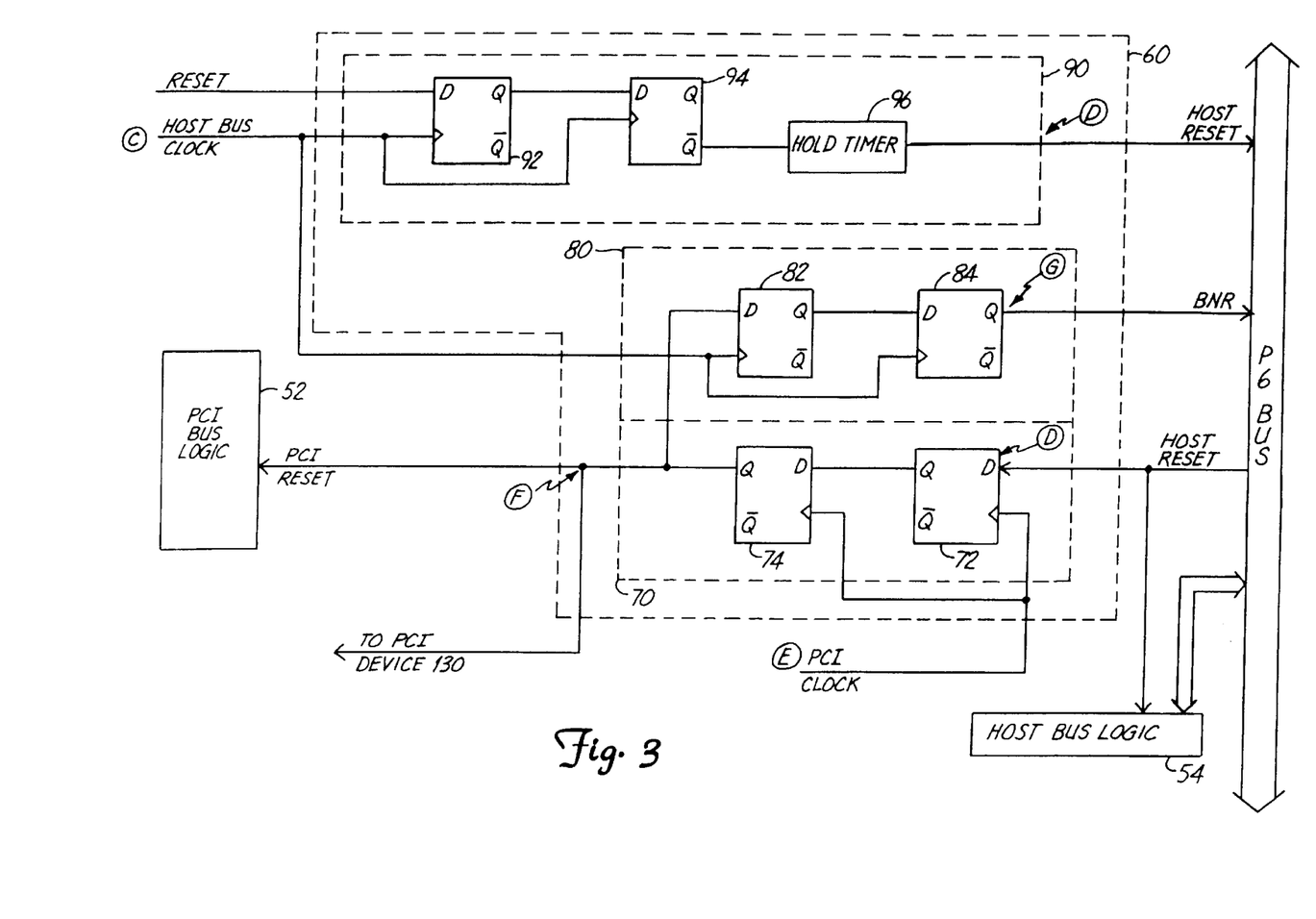
FIG. 3 is a block diagram illustrating some of one embodiment of the components shown in FIG. 2 in greater detail.

In FIGS. 2 and 3, some components of the computer system 1 of FIG. 1 are shown in greater detail. As shown in FIG. 2, the controllers 50 may comprise host bus logic 54 for interfacing with the host bus 30, PCI bus logic 52 for interfacing with a respective PCI bus 110 and synchronization logic 60 for synchronizing signals or commands from the host clock domain to a respective PCI clock domain and vice versa.

As also shown in FIG. 2, the synchronization logic 60 may comprise a first synchronizer 70 for synchronizing commands clocked in the host clock domain into commands clocked in a respective PCI clock domain. For example, a reset command may have been asserted by any device in the computer system 1 and provided to the host bus 30 in the host clock domain. The first synchronizer 70 may then receive the reset command clocked in the host clock domain from the host bus 30, synchronize the reset command into a respective PCI clock domain, and provide the reset command clocked in the respective PCI clock domain to the respective PCI bus logic 52 and to the respective PCI device 130, thereby resetting these components.

Referring now to FIG. 3, the first synchronizer 70 may comprise a pair of flip-flops 72 and 74. The reset command clocked in the host clock domain may be received by the D input of flip-flop 72 and clocked into a PCI clock domain by the PCI clock of the respective PCI clock domain. The Q output of flip-flop 72 may be provided to flip-flop 74 and again clocked with the respective PCI clock. Thus, at point F of FIG. 3, the reset command will be within the respective PCI clock domain, and may be provided to (and reset) the respective PCI bus logic 52 and the respective PCI device 130. (It should be noted that the synchronizing of the reset command into the PCI clock domain may be performed using only one flip-flop 72, however, the stability of the reset command signal may be improved by using the second flip-flop 74).

Referring again now to FIG. 2, the synchronization logic 60 may also comprise a second synchronizer 80 for synchronizing a reset command that has been synchronized into a respective PCI clock domain by the first synchronizer 70 back into the host clock domain. The second synchronizer 80 may provide the reset command synchronized back into the host clock domain to the host bus 30 as a blocking signal. A blocking signal provided to the host bus 30 may block transactions from being issued to or initiated on the host bus 30 by the requesting agents. For example, the second synchronizer 80 may provide a P6 bus 30 with a Block Next Request (BNR) signal that blocks transactions, including processor 10 initiated transactions, from being issued to the P6 bus 30. (The BNR signal is described in detail in the Pentium Pro Family Developer's Manual, Volume 1: Specifications (1996), which is incorporated herein by reference). As shown in FIG. 3, the second synchronizer 80 also comprises a pair of flip-flops 82 and 84, although as noted above, one flip-flop 82 may be sufficient for synchronizing the reset signal across clock domains.

The synchronization logic 60 may also comprise a third synchronizer 90 for synchronizing commands clocked in a PCI clock domain into the host clock domain. The third synchronizer may receive a reset command asserted by a respective PCI device 130 and clocked in a respective PCI clock domain, synchronize the reset command into the host clock domain and provide the reset command clocked in the host clock domain to the host bus 30.

As shown in FIG. 3, the third synchronizer may also comprise a pair of flip flops 92 and 94, although as noted above, one flip-flop 92 may be sufficient for synchronizing the reset signal across clock domains. In an alternative embodiment, the third synchronizer 90 may also comprise a hold timer 96. One purpose of the hold timer 96 may be to insure that a reset command asserted by a PCI device and synchronized into the host clock domain is provided to the host bus 30 for a time period in which components clocked in the host clock domain, including the Pentium Pro processors 10, may detect the reset command. In one embodiment the hold timer may hold the reset signal for approximately 2 milliseconds.

5.2 Method of Operation

Referring now to FIGS. 1–4, the operation of one embodiment of the present invention will now be described. Specifically, the method of determining when the target agents of a computer system are out of reset and the method of blocking or inhibiting transactions on the host bus until it is determined that the target agents are out of reset will now be described.

The operation of one embodiment of the present invention will be described by way of example. The example is for purposes of illustration only and is not intended in a limiting sense. Specifically, it is understood that characteristics of the signals and commands in the example, such as the duration a signal or command is asserted, whether a signal or command is asserted or deasserted on a rising or falling clock edge or whether a signal or command is active high or active low, are for illustration purposes only.

Figure 4:
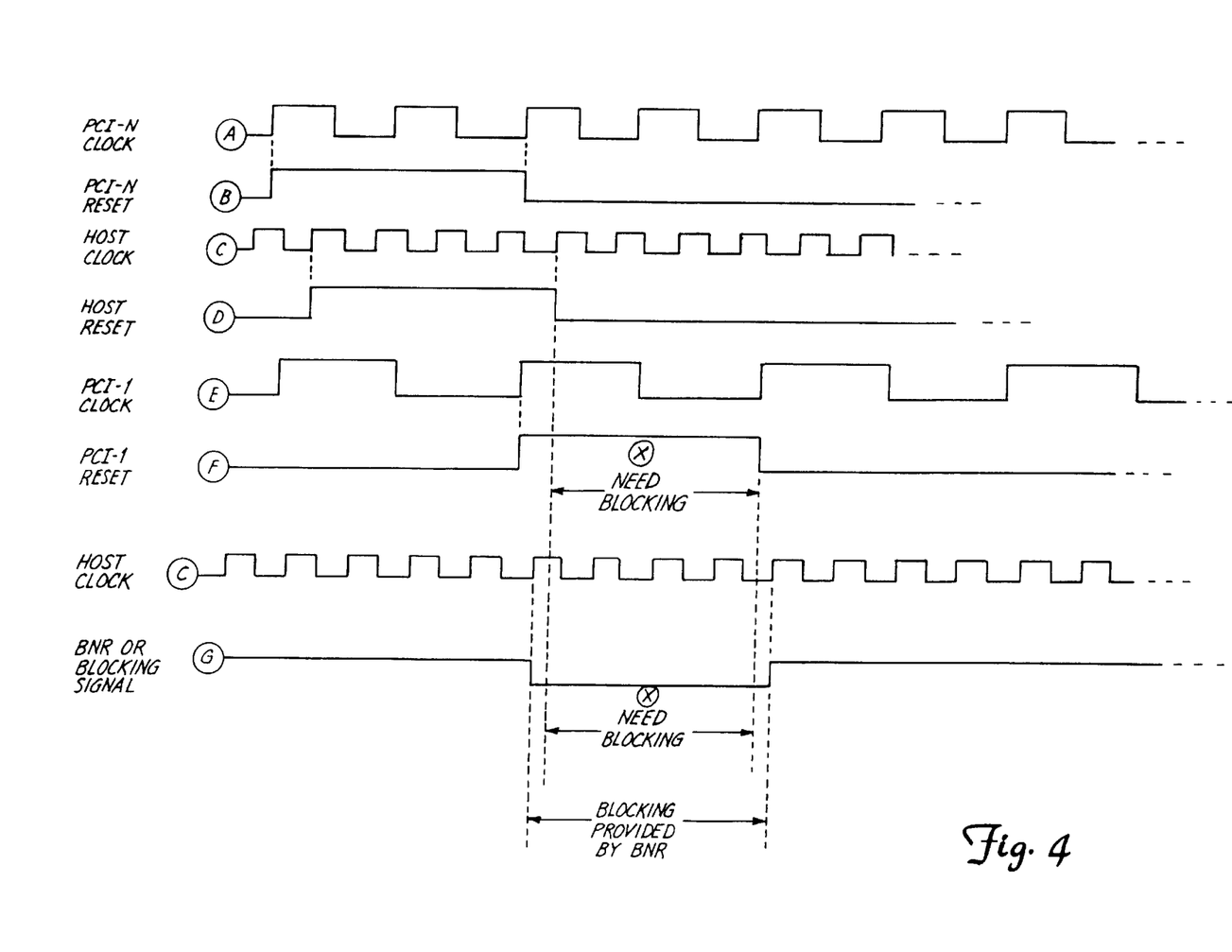
FIG. 4 is a timing diagram illustrating operation of the present invention.

In FIGS. 1–4, an Nth PCI device 130 may be clocked at an Nth PCI clock frequency in an Nth PCI clock domain. The clock signal clocked at the Nth PCI frequency is shown as signal A in FIG. 4. The Nth PCI device 130 may assert a system reset command shown as signal B in FIG. 4. In this example, the reset command B may be an active high command and may transition to an active state and an inactive state on the rising edge of the Nth PCI clock signal A as shown in FIG. 4. In this example, the reset command B is asserted for 2 Nth PCI clock periods.

The reset command B may be provided to the third synchronizer 90 of a respective controller 50. The third synchronizer 90 may synchronize the reset command B clocked in the Nth PCI clock domain such that the reset command is clocked by the host clock into the host clock domain. In FIG. 4, the host clock is shown as signal C and the reset command synchronized into the host clock domain is shown as signal D. (Signals or commands referenced by alphanumeric characters in FIG. 4 are also be identified in FIGS. 2 and 3 as points where the signal or command may be observed). In this example, the reset command D clocked in the host clock domain is asserted active high on the first rising edge of the host clock C following the assertion of the reset command B clocked in the Nth PCI clock domain.

The reset command D clocked in the host clock domain may be provided to the host bus 30. The host bus 30 may provide the reset command D to all components within the computer system 1 operably connected to the host bus 30, including the first synchronizer 70 of a first controller 50 operably connected to a first PCI device 130 as shown in FIG. 2.

The first synchronizer 70 may synchronize the reset command D clocked in the host clock domain such that the reset command is clocked by a first PCI clock in the first PCI clock domain.

In FIG. 4, the first PCI clock is shown as signal E and the reset command synchronized into the 21 first PCI clock domain is shown as signal F. In this example, the reset command F synchronized into the first PCI clock domain is asserted active high on the first rising edge of the first PCI clock E following the assertion of the reset command D clocked in the host clock domain. The reset command F synchronized into the first PCI clock domain may be provided to the first PCI logic 52 and first PCI device 130, thereby resetting those computer system components.

At this point, it may be seen in FIG. 4 that during time period X, the reset command D clocked in the host clock domain will have been deasserted, while the reset command F clocked in the first PCI clock domain remains asserted. It may also be seen that as the clock frequency of the first PCI device clock E is decreased (i.e., the time between clock transitions is increased), the duration of time period X is increased. In other words, if a PCI device 130 is clocked at a relatively low frequency compared to the host clock C, a significant number of host clock cycles may occur before the reset command F clocked in the clock domain of the PCI device is deasserted. During these host clock cycles of time period X, a Pentium Pro processor 10 or other requesting agent within the host clock domain will be out of reset and ready to issue transactions to the PCI device 130 via the host bus 30.

Thus, during this time period X, it is desirable that a Pentium Pro processor 10 or other requesting agent clocked in the host clock domain be blocked or inhibited from issuing transactions on the P6 bus 30 to the first PCI device 130 until the first PCI device 130 is out of reset (i.e., until the reset command F clocked in the first PCI clock domain has been deasserted). Accordingly, in one embodiment of the present invention, the reset command F clocked in the first PCI clock domain (which resets the respective PCI components) is provided to the second synchronizer 80 and synchronized back into the host clock domain. The second synchronizer 80 may provide the reset signal synchronized back into the host clock domain to the P6 bus 30 as a blocking signal or BNR signal. The BNR signal is shown as Signal G in FIG. 4. In this example, the BNR signal G may be an active low signal asserted on the first rising edge of the host clock C following the assertion of the reset command F clocked in the first PCI clock domain. It may be seen in FIG. 4 that the BNR Signal G will be asserted until, in this example, the first rising edge of the host clock C following the deassertion of the reset command F clocked in the first PCI clock domain. In other words, the second synchronizer 80 provides the P6 bus 30 with a BNR signal G until the second synchronizer 80 determines that the reset command F clocked in the first PCI clock domain has been deasserted (i.e., when the respective PCI devices are out of reset). Thus, in the computer system comprising a plurality of PCI devices 130 shown in FIG. 1, transactions on the host bus 30 will be blocked or inhibited until it is determined that the slowest PCI device 130 is out of reset. (It will be clear to those skilled in the art that the "slowest" PCI device during one particular system reset operation may not be the slowest PCI device during, for example, the next system reset operation. In other words, the PCI device clocked at the lowest clock frequency may change depending upon the configuration and operation of the computer).

Essentially, the first and second synchronizers 70 and 80 may be operating as a dynamic blocking timer for defining a dynamic minimum time period during which transactions on the host bus 30 are blocked. The dynamic blocking timer components are responsive to the clock frequency at which a respective secondary device or target agent is clocked. Thus, the first and second synchronizers 70 and 80 may block transactions on a host bus 30 for a relatively greater number of host clock domain clock cycles when a target agent is clocked at a relatively low frequency and for a relatively lesser number of host clock domain clock cycles when a target agent is clocked at a relatively high frequency. The blocking of transactions on the host bus 30 will occur until the BNR signal G is deasserted in response to the deassertion of the respective reset command F clocked in the respective PCI clock domain.

5.3 Remarks Embodiments of the present invention may be particularly beneficial in computer systems comprising some of the components shown in FIG. 2. In FIG. 2, in addition to the components discussed above, the computer system 1 may comprise an ISA device 170 operably connected to an ISA bus 150 via connection 160. The ISA bus 150, in turn, may be operably connected to a PCI device 130 (here, the first PCI device). As such, a requesting agent may issue a transaction to the ISA device 170 over the host bus 30.

The PCI bus 110 operably connected to the ISA bus 150 and ISA device 170 may be referred to as a "legacy bus," in that ISA buses and ISA devices are legacies from computer system architectures that are rapidly becoming obsolete. For compatibility purposes, however, ISA buses and ISA devices (and other "legacy" type devices) may still be integrated into modern computer systems.

Legacy buses and their respective operably connected components may be clocked at substantially lower clock frequencies than non-legacy buses (e.g., PCI buses operably connected to PCI devices only). As shown in FIG. 4, a reset command provided to a component in a clock domain clocked at a substantially lower relative clock rate may require a significant number of host clock cycles to be synchronized into its respective domain. Accordingly, one benefit of the present invention is dynamically blocking transactions on the host bus 30 until the reset command synchronized into the clock domain of the legacy bus has been deasserted.

It will be readily apparent to those skilled in the art that innumerable variations, modifications, applications, and extensions of these embodiments and principles can be made without departing from the principles and spirit of the invention. For example, in some computer systems, a selective reset command may be provided to the host bus 30, which may selectively reset only a subset of the bus agents that may be reset by a system reset command. Additionally, in these computer systems, the host bus 30 may be configured such that a blocking signal or command provided to the host bus 30 from a particular bus agent only blocks transactions to that particular bus agent. In such computer systems, the present invention may operate such that transactions on the host bus 30 are only blocked or inhibited from being issued to the target agents being selectively reset, while transactions on the host bus 30 to other target agents not reset may proceed. Accordingly, it is intended that the scope of the invention be only limited as necessitated by the accompanying claims.

What is claimed is:

1. In a computer system having a host bus clocked in a host bus clock domain and a target agent clocked in a target agent clock domain, a method for blocking transactions on a host bus until a target agent is out of reset, comprising:
   synchronizing a reset signal received by the host bus in the host bus clock domain such that the reset signal is clocked in the target agent clock domain;
   synchronizing the reset signal clocked in the target agent clock domain back into the host bus clock domain;
   determining whether the reset signal clocked in the target agent clock domain is deasserted; and
   blocking transactions on the host bus with the reset signal that has been synchronized back into the host bus clock domain until it is determined that the reset signal clocked in the target agent clock domain has been deasserted.

2. The method of claim 1, wherein the computer system comprises a processor and wherein the act of blocking further comprises the act of blocking a processor initiated transaction on the host bus until it is determined that the reset signal clocked in the target agent clock domain has been deasserted.

3. A method for issuing transactions on a host bus clocked in a host bus clock domain to a target agent clocked in a target agent clock domain, comprising:
   receiving a reset command clocked in the host bus clock domain:
   synchronizing the reset command clocked in the host bus clock domain into the target agent clock domain;
   synchronizing the reset signal clocked in the target agent clock domain back into the host bus clock domain;
   determining whether the target agent is out of reset; and
   blocking transactions on the host bus with the reset signal that has been synchronized back into the host bus clock domain until it is determined that the target agent is out of reset.

4. The method of claim 3, wherein the act of blocking transactions on the host bus further comprises providing a BNR signal to the host bus.

5. The method of claim 3, wherein the act of synchronizing the reset command clocked in the host bus clock domain into the target agent clock domain further comprises clocking the reset command clocked in the host bus clock domain with the target agent clock.

6. A method for issuing transactions on a host bus clocked in a host bus clock domain, comprising:
   providing a requesting agent for issuing transactions to target agents;

receiving a reset command clocked in the host bus clock domain;

synchronizing the reset command clocked in the host bus clock domain into the clock domain of a first target agent clocked at a first clock frequency;

synchronizing the reset command clocked in the host bus clock domain into the clock domain of a second target agent clocked at a second clock frequency, wherein the first clock frequency is less than the second clock frequency;

synchronizing the reset commands clocked in the time domains of the respective target agents back into the host bus clock domain;

resetting the first and second target agents with the reset command clocked in the time domain of the respective target agents; and blocking transactions issued by the requesting agent on the host bus with the reset command that has been synchronized back into the clock domain of the first target agent until it is determined that the first target agent is out of reset.

7. The method of claim 6, further comprising:

providing a third target agent for issuing a reset command; and synchronizing a reset command issued by the third target agent into the host bus clock domain.

8. A method for issuing transactions on a host bus clocked in a host bus clock domain, comprising:

asserting a reset command in the host bus clock domain;

synchronizing the reset command asserted in the host bus clock domain such that the reset command is asserted in the clock domain of a target agent;

asserting a blocking signal in the host clock domain in response to the assertion of the reset signal asserted in the target agent clock domain by synchronizing the reset command asserted in the clock domain of the target agent such that it is again asserted in the host bus clock domain; and deasserting the blocking signal in response to the deassertion of the reset signal asserted in the clock domain of the target agent.

9. The method of claim 8, wherein the blocking signal is deasserted during the next full cycle of the host bus clock domain following the deassertion of the reset signal asserted in the clock domain of the target agent.

10. The method of claim 8, further comprising providing the asserted blocking signal to the host bus.

11. The method of claim 8, further comprising resetting the target device with the reset command asserted in the clock domain of a target agent.

* * * * *

UNITED STATES PATENT AND TRADEMARK OFFICE
CERTIFICATE OF CORRECTION

PATENT NO.  : 6,134,656
DATED       : October 17, 2000
INVENTOR(S) : Paul A. LaBerge Page 1 of 1

It is certified that error appears in the above-identified patent and that said Letters Patent is hereby corrected as shown below:

Column 3,
Line 45, "Signals internal It to a" should read -- Signals internal to a --.
Line 53, "host clock 16 domain" should read -- host clock domain --.
Line 57, "PCI buses 10" should read -- PCI buses 110 --.
Line 59, "within a 21 respective" should read -- within a respective --.

Column 6,
Line 27, "into the 21 first" should read -- into the first --.

Column 7,
Line 37, "5.3 Remarks Embodiments of the present invention may be" should read -- 5.3 Remarks. -- .
Line 38, Should begin new paragraph with -- Embodiments of the present invention...--.

Column 8,
Line 25, "clocked in the target" should read -- clocked into the target --.

Signed and Sealed this

Fourteenth Day of August, 2001

*Attest:*

*Attesting Officer*

NICHOLAS P. GODICI
*Acting Director of the United States Patent and Trademark Office*